United States Patent
Boeckenhauer et al.

(10) Patent No.: US 8,924,914 B2
(45) Date of Patent: Dec. 30, 2014

(54) APPLICATION CREATION TOOL TOOLKIT

(75) Inventors: Jens Boeckenhauer, Wiesloch (DE); Rohan Saundattikar, Dewas (IN)

(73) Assignee: SAP SE, Walldorf (DE)

( * ) Notice: Subject to any disclaimer, the term of this patent is extended or adjusted under 35 U.S.C. 154(b) by 457 days.

(21) Appl. No.: 13/159,465

(22) Filed: Jun. 14, 2011

(65) Prior Publication Data

US 2012/0324421 A1  Dec. 20, 2012

(51) Int. Cl.
*G06F 9/44* (2006.01)

(52) U.S. Cl.
CPC .............................. *G06F 8/30* (2013.01)
USPC ............ 717/100; 717/104; 717/106; 717/108

(58) Field of Classification Search
CPC ............... G06F 8/10; G06F 8/20; G06F 8/24; G06F 8/30
See application file for complete search history.

(56) References Cited

U.S. PATENT DOCUMENTS

| | | | |
|---|---|---|---|
| 6,675,230 B1 * | 1/2004 | Lewallen ....................... 719/328 |
| 7,086,009 B2 * | 8/2006 | Resnick et al. ................ 715/771 |
| 7,895,579 B2 * | 2/2011 | Guerrera et al. .............. 717/125 |
| 8,219,974 B2 * | 7/2012 | Schmidt ......................... 717/120 |
| 8,595,696 B2 * | 11/2013 | Maximilien et al. .......... 717/110 |
| 8,671,385 B2 * | 3/2014 | Byrd et al. ..................... 717/100 |
| 8,677,308 B2 * | 3/2014 | Hopkins ......................... 717/100 |
| 2003/0009250 A1 * | 1/2003 | Resnick et al. .................. 700/94 |
| 2005/0071803 A1 * | 3/2005 | Cherdron et al. ............. 717/101 |
| 2006/0059461 A1 * | 3/2006 | Baker et al. ................... 717/113 |
| 2007/0260737 A1 * | 11/2007 | Gomes et al. ................. 709/229 |
| 2008/0320441 A1 * | 12/2008 | Ahadian et al. ............... 717/108 |
| 2009/0158238 A1 * | 6/2009 | Jung et al. ..................... 717/100 |
| 2012/0254825 A1 * | 10/2012 | Sharma et al. ................. 717/101 |

OTHER PUBLICATIONS

Bianchini et al., Semantics-enabled web APIs selection patterns, Sep. 2011, 5 pages.*

Farooq et al., API usability peer reviews: a method for evaluating the usability of application programming interfaces, Apr. 2010, 10 pages.*

Anonymous; SAP Visual Composer; published 2008 on-line by Zui Ltd. UK, pp. 7 (http://www.zui.co.uk/SAP_Visual_Composer_Whitepaper.pdf).

* cited by examiner

*Primary Examiner* — Thuy Dao

(57) ABSTRACT

Various embodiments of systems and methods for an application creation tool (ACT) toolkit are described herein. The ACT toolkit includes a set of application creation APIs and an application creation service for invoking the set of application creation API. An ACT is in communication with the application creation service of the ACT toolkit. The ACT sends an application creation request to the application creation service for creating a UI application. The ACT can be customized by re-defining the application creation service of the ACT toolkit and establishing a communication between the re-defined application creation service and the ACT. The re-defined application creation service invokes the set of API to create a customized application object for the UI application.

16 Claims, 9 Drawing Sheets

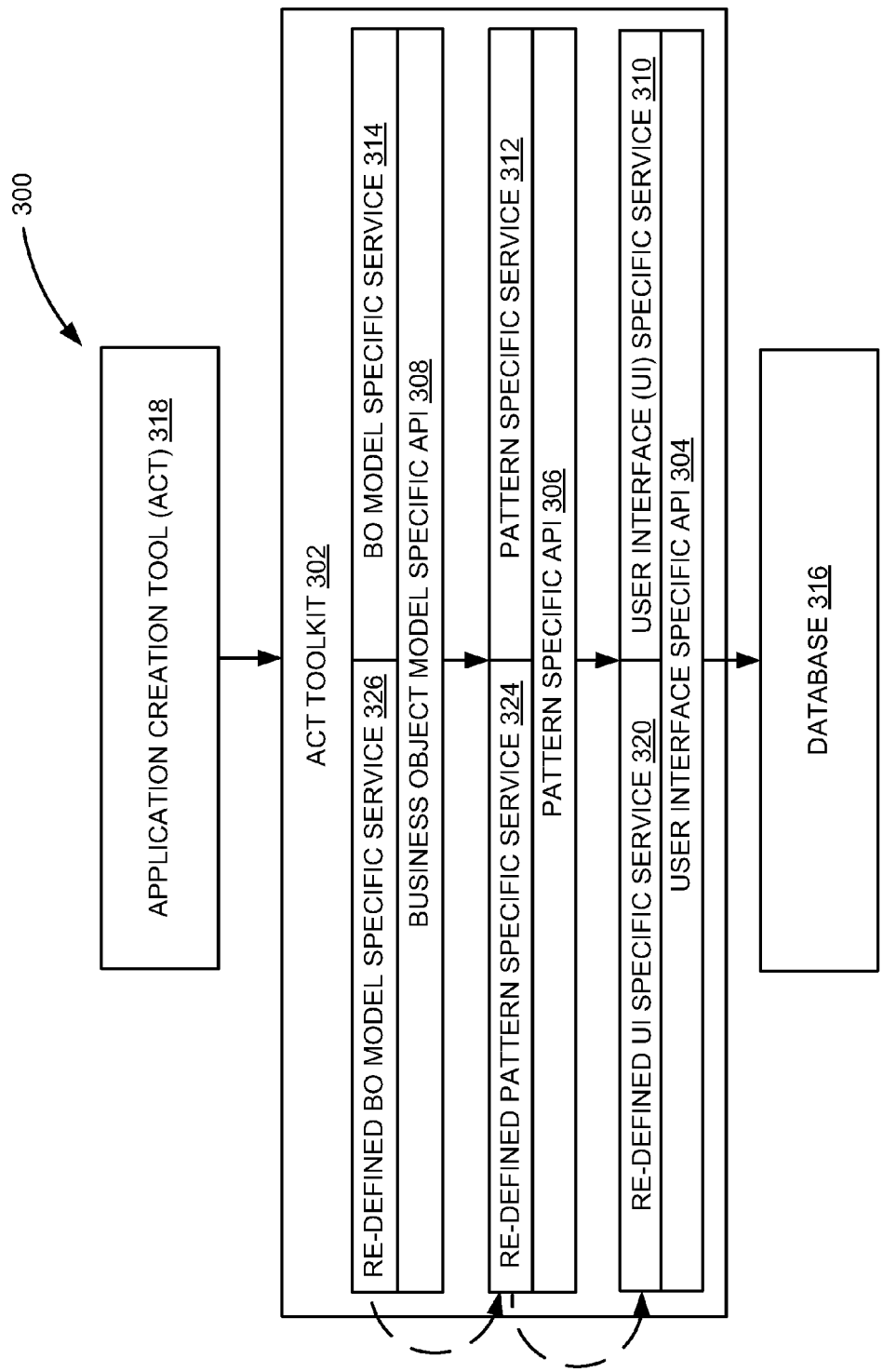

Application Creation Tool: Step 2 (Select BOL Component) 400

Previous  Next  Save

1 — 402  Create Components
2 — 404  Select BOL Component
3 — 406  BOL Component Hierarhy
4 — 408  Set Transport Details ★ Component Name: EPM
★ Dynamic Query Name: AdvQueryOrderby Header — 418, 420
  Include Create Scenario ☐

FIG. 4B

Application Creation Tool: Step 3 (BOL Component Hierarchy) 400

| Object Relation 422 | GUIBB Type | Feeder Class 426 | Join Configurations | Create | Configurat... | Description |
|---|---|---|---|---|---|---|
| ▼EPMPurchaseOrder | FORM_GL2 | CL_GUIBB_BOL_FORM |  | ☑ | ZECE_P_M_ |  |
| • ActionProperties | FORM_GL2 | CL_GUIBB_BOL_FORM | ☑ | ☐ | ZECACTIO.... |  |
| ▶EmployeeRel | FORM_GL2 | CL_GUIBB_BOL_FORM | ☑ | ☐ | ZECEMPL.... |  |
| •EmployeeAddressRel | FORM_GL2 | CL_GUIBB_BOL_FORM | ☑ | ☐ | ZECEMPL.... |  |
| ▲ EmployeeOrgRel | FORM_GL2 | CL_GUIBB_BOL_FORM | ☑ | ☐ | ZECEMPL.... |  |
| • HeaderNoteRel | FORM_GL2 | CL_GUIBB_BOL_FORM |  | ☐ | ZECHEAD.... |  |
| ▼ItemRel | LIST | CL_GUIBB_BOL_LIST |  | ☑ | ZECITEM_RE |  |
| •ItemNoteRel | FORM_GL2 | CL_GUIBB_BOL_FORM | ☑ | ☐ | ZECITEM_... |  |
| ▲ProductRel | FORM_GL2 | CL_GUIBB_BOL_FORM | ☑ | ☐ | ZECPROD.... |  |
| •ScheduleLineRel | FORM_GL2 | CL_GUIBB_BOL_FORM |  | ☐ | ZECSCHE.... |  |
| ▼PartnerDel | LIST | CL_GUIBB_BOL_LIST |  | ☑ | ZECPARTNE |  |
| •AddressDel | LIST | CL_GUIBB_BOL_LIST |  | ☑ | ZECADDRES |  |
| •Search GUIBB | SEARCH | CL_GUIBB_BOL_DQUERY |  | ☑ | ZECFPM_QA |  |
| •Result List GUIBB | LIST | CL_GUIBB_BOL_LIST |  | ☑ | ZECFPM_QA |  |

APPLICATION CREATION TOOL TOOLKIT

FIELD

Embodiments generally relate to computer systems, and more particularly to methods and systems for creating applications.

BACKGROUND

Several tools, such as Visual Composer, by SAP, AG of Walldorf, Germany, are available in market which allow a user to create applications. These tools allow the user to create applications based on pre-defined application creation guidelines. However, such application creation guidelines change from time to time and these tools cannot be customized to create applications which are compliant with the changed guidelines.

Further, a user creating applications may want to customize one or more objects being created for the applications. For example, the user may want to create a customized toolbar for each application created by the tool. In the existing systems, the user has to individually change the toolbar for each created application, which is time consuming and undesirable.

Therefore, there is a need for a system and method that allows a user to customize an application creation tool based on the requirement of the user.

SUMMARY

Various embodiments of systems and methods for application creation tool toolkit are described herein.

In one aspect, an application creation tool (ACT) toolkit is provided. The ACT toolkit includes a set of application creation APIs to create a plurality of application objects, and an application creation service to invoke the set of application creation APIs to create an application object from the plurality of application objects for an application.

In a further aspect, input is received to re-define the application creation service. The redefined application creation service invokes the set of application creation APIs to create a customized application object from the plurality of application objects for the application.

In yet another aspect, communication is established between the re-defined application creation service and the ACT. The re-defined application creation service receives an application creation request from the ACT for creating the customized application object for the application, via the established communication.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 3 is a block diagram illustrating an application creation framework for creating a customized application object for an application, according to an embodiment.

FIG. 4A-4D illustrate an exemplary ACT, according to an embodiment.

FIG. 5 illustrates an exemplary application created by the ACT of FIG. 4A-4D, according to an embodiment.

DETAILED DESCRIPTION

Embodiments of techniques for application creation tool toolkit are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
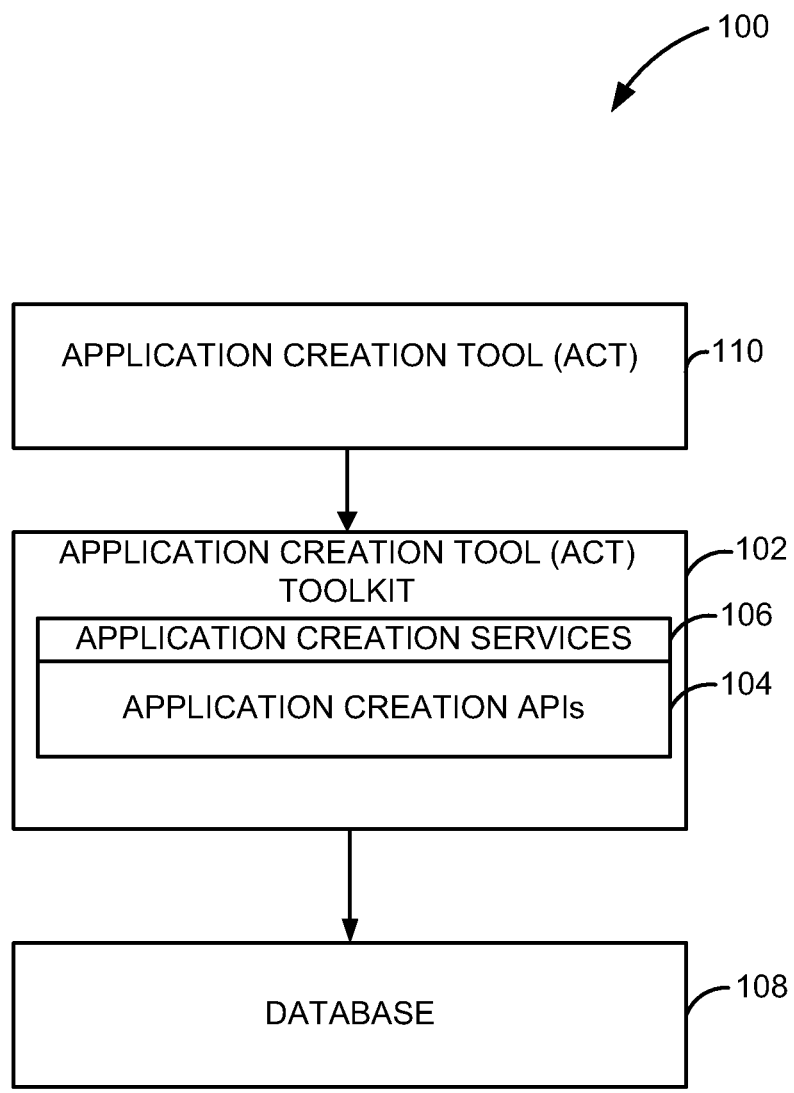
FIG. 1 is a block diagram illustrating an application creation framework, according to an embodiment.

FIG. 1 is a block diagram illustrating an application creation framework 100, according to an embodiment. The application creation framework 100 may be used for creating an application. Application or, application program, is a program that an end-user runs to accomplish certain tasks. An application creation process may include selecting a user interface for the application and defining the communication between user interface elements of the user interface and data stored in a backend system.

As shown, the application creation framework 100 includes an application creation tool (ACT) toolkit 102. According to one embodiment, the ACT toolkit 102 includes application creation "application programming interfaces" (APIs) 104 and application creation services 106 for invoking the application creation APIs 104.

In one embodiment, the application creation APIs 104 can create application objects which can be used to create the application. The application objects created by the application creation APIs 104 may be re-usable application objects, i.e., the same application object can be re-used for creating different applications. For example, an application object can be in a re-usable form such that it can be used in a ticket reservation application or a search application.

The application creation APIs 104 may also retrieve business object model specific objects from a database 108 for creating different applications. The application creation APIs 104 also create configurations for binding the created application objects to obtain the application. For example, the configurations may specify the arrangement of the created application objects on the user interface and the linking of the created application objects with the database 108.

In one embodiment, the application creation APIs 104 may include a plurality of application creation methods for creating the application objects. The application creation methods may also retrieve a business object model specific objects from the backend system.

The application creation services 106 invoke the set of application creation APIs 104 to create the plurality of application objects for the application. In one embodiment, the application creation services 106 are adaptable, i.e., the application creation services 106 can be re-defined to invoke the set of application creation objects to create a customized application object.

The application creation framework 100 further includes an application creation tool (ACT) 110 which is in communication with the application creation services 106 of the ACT toolkit 102. The ACT 110 presents application creation options to an end user for creating the application. According to one embodiment, the ACT 110 may include a user interface for presenting the application creation options. In one embodiment, the application creation options include some of the application objects that the application creation APIs 104 can create and some of the business object model specific objects that can be retrieved from the database 108.

In one embodiment, the end user selects an application object from the presented application creation options at the ACT. The user selected application object forms an application creation request which the ACT 110 sends to the application creation services 106 for creating the application. In one embodiment, the ACT 110 includes a plurality of application creation service invoking methods for sending the application creation requests to the application creation service. The application creation service invoking methods are defined to invoke the application creation services for creating the user selected application objects.

Finally, the application creation APIs 104 configure the created application objects to create the application. The created application can then be stored in the database 108.

Figure 2:
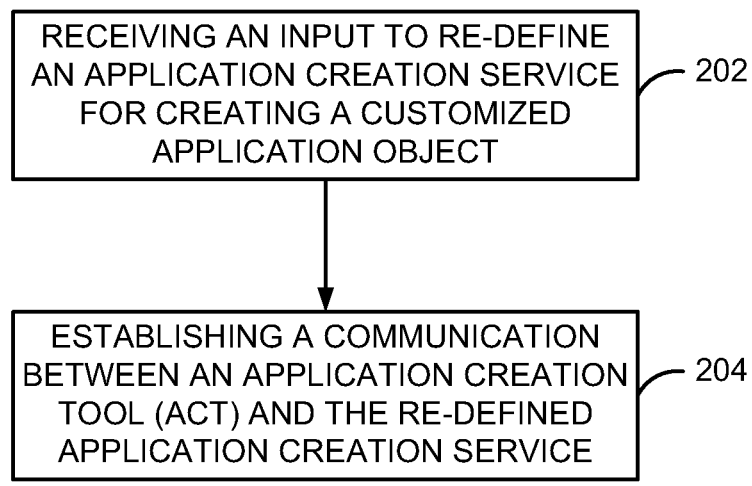
FIG. 2 is a flow diagram illustrating a method for customizing the ACT, according to an embodiment.

FIG. 2 is a flow diagram illustrating a method for customizing the ACT, according to an embodiment. Initially at block 202 an input is received to re-define the application creation services of the ACT toolkit. In one embodiment, a developer input is received to redefine one of the application creation services. The developer develops a re-definition of the application creation service of the ACT toolkit to obtain a re-defined application creation service for the ACT toolkit.

The developed re-defined application creation service is defined to invoke the application creation APIs to create a customized application object from the plurality of application objects which the application creation APIs can create. In one embodiment, the re-defined application creation service invokes the application creation methods of the application creation APIs to create the customized application object.

For example, the application creation APIs of the ACT toolkit may include an application creation method "Create Toolbar Button." During a standard implementation, i.e., before re-definition of the application creation service, the application creation services invokes the application creation method "Create Toolbar Button" to create a "save" button.

Suppose that the customer or partner wants that a "close" button to be created along with the "save" button when the user selected application object is the toolbar. In this case, the developer develops a re-defined user interface specific service which invokes the application creation method "Create Toolbar Button" to create the "save" button and the "close" button.

In one embodiment, the developer develops the re-defined application creation service using the Object Oriented (OO) principles. In this case, the re-defined application creation service inherits the application creation service. The developer then performs modification on the inherited application creation service to obtain the re-defined application creation service.

In the above example, the re-defined application creation service inherits the application creation service which invokes the application creation method "Create Toolbar Button". The developer then re-defines the application creation request to create the re-defined application creation request which invokes the "Create Toolbar Button" to create both the "save" button and the "close" button.

Finally at block 204, communication is established between the re-defined application creation service and the ACT. In one embodiment, the communication is established to transfer the user selected application objects at the ACT to the re-defined application creation service in the ACT toolkit.

In one embodiment, the communication is established by re-defining the application creation service invoking methods of the ACT. The re-defines application creation service are defined to invoke the re-defined application creation service.

After establishing the connection, the ACT is customized to create the customized application objects. When the end user executes the ACT, the end user obtains the customized application object for the application based on the re-definition of the application creation service. In the example above, if the end user selects the toolbar button option at the customized ACT for creating an application, the created application includes the "save" button and the "close" button (i.e., the customized application object).

FIG. 3 is a detailed block diagram illustrating an application creation framework 300 for creating a customized application object for an application, according to an embodiment.

The application creation framework 300 includes an application creation tool (ACT) toolkit 302. As shown, the ACT toolkit 302 includes a user interface specific API 304, a pattern specific API 306, and a business object model specific API 308. Further, the ACT toolkit 300 also includes a user interface specific service 310 for invoking the user interface specific API 304, a pattern specific service 312 for invoking the pattern specific API 306, and a business object (BO) model specific service 314 for invoking the business object model specific API 308.

The user interface specific API 304 creates user interface specific objects. User interface specific objects may include the application objects that are displayed on the user interface of a application. In one embodiment, the user interface specific objects created by the user interface specific API 304 are re-usable user interface specific objects. A few exemplary re-usable user interface specific objects are a radio button or a checkbox which are not fixed for a particular application but can be re-used in several different applications. In one embodiment, the user interface specific objects may be the re-usable user interface specific objects provided by Web Dynpro, a development tool provided by SAP AG, of Walldorf, Germany.

The user interface specific API 304 includes a plurality of application creation methods for creating the user interface specific objects. For example, the user interface specific APIs 304 may include a method "Create checkbox" for creating the checkbox for a application. In one embodiment, the user interface specific service 310 invokes at least one of the application creation methods included in the user specific API 304 to create user interface specific objects for the application. The user interface specific service 310 is adaptable and can be re-defined to invoke the user interface specific API 304 to create a customized application object.

The pattern specific API 312 are defined to create a plurality of pattern specific objects. The pattern specific objects or patterns are configurable, re-usable user interface units designed to let an end user accomplish a specific but generically defined task, such as searching for business objects.

In one embodiment, the pattern specific objects created by the pattern specific API 306 are generic pattern specific objects which include a pre-defined arrangement for the user interface specific objects.

A pattern specific object containing the components necessary to implement a complete application may be referred to as an "application floorplan". Examples of different pattern specific objects include an object instance (OI) floorplan, an overview page (OVP) floorplan, a guided activity floorplan (GAF), or a quick activity floorplan (QAF). Each of these floorplans provides a predefined pattern which can be used in several different applications. Another example of a re-usable pattern specific object created by the pattern specific API 306 is a "form", or a "list."

The pattern specific API 306 includes a plurality of application creation methods for creating the plurality of pattern specific objects. For example, the pattern specific API 306 may include the application creation method for creating an OVP floorplan. This method creates a generic pattern, which arranges the different user interface specific objects in a manner defined by the OVP floorplan. In one embodiment, the pattern specific service 312 invokes the application creation methods of the pattern specific API 306 to create the pattern specific objects for the application.

In the example discussed above, the pattern specific service 312 invokes the method for creating the OVP floorplan to provide the pre-defined generic OVP pattern and arrange the different user interface object in a pre-defined manner defined for the OVP pattern.

In one embodiment, the pattern specific service 312 invokes the user interface specific service 310, which invokes the user interface specific API 304 to create user interface specific objects for the application.

The business object model specific API 308 handles the communication between the application and the backend system. In one embodiment, the backend system is a database 316 that stores the business object model related data.

In one embodiment, the business object model is one of the business object models such as Business Object Layer (BOL), Business Object Process Framework (BOPF), and Enterprise Service Framework (ESF). Interfaces for these business object models have implementation of feeder classes, connector classes and transaction handlers which can be used to easily create an application.

These business object models provide a plurality of business object model specific objects. The business object model specific objects may include a business object model specific component, and the business object relations for the business object model specific component. The business object model also includes suggestions about the different pattern specific objects that can be created for each of the object relations of a particular business object model specific component. The business object model specific data is stored in the database 316.

An example of the business object model specific object may be a main invoice which may have a related secondary invoice (object relations). The business object model may provide suggestions that the pattern specific object to be created for the main invoice is list, and the pattern specific object to be created for the secondary invoice is a form.

The business object model specific API 308 retrieves the business object model specific objects from the database 316.

In one embodiment, the business object model specific API 308 includes methods for retrieving the business object model specific objects from the database 316. In one embodiment, the business object model specific objects being retrieved from the database 316 is the object relations for a business object model specific component.

Further, as discussed above, the business object models have implementation of feeder class. A feeder class is defined for a particular pattern specific object. For example, the business object model may define a "form feeder class" for a form, a "list feeder class" for a list. Feeder class may define the way a particular pattern type, such as the form or the list, is to be created, and the communication between the user interface and the backend system, such as the database. A feeder class may define the pattern specific object to be created in a default pre-defined manner.

As discussed above, the business object model provides suggestions of the pattern specific objects that can be created for each of the object relations. The generic feeder classes for the different pattern specific objects are pre-defined. In one embodiment, the business object model specific API 308 connects the user interface specific objects to the database via these pre-defined feeder classes during runtime of the application.

The business object model specific service 314 invokes the business object model specific API 308 to retrieve the business object model specific components from the database. In one embodiment, the business object model specific service 314 assigns the feeder classes to the different pattern specific objects being created for the application.

The application creation framework 300 further includes an application creation tool (ACT) 318 which is in communication with the business object model specific service 314 of the ACT toolkit 302. The ACT 318 includes a user interface for presenting the application creation options.

In one embodiment, the application creation options include one or more of the user interface specific objects, one or more of the pattern specific objects, and one or more of the business object model specific components.

As discussed above, the user interface specific API 304 can create a plurality of user interface specific objects such as buttons, entry boxes, the pattern specific API 306 can create a plurality of pattern specific objects such as the different floorplans "OVP", "GA", "OI", or "QA", and the business object model specific API 308 can retrieve business object model specific objects such as object relations for a particular business object model specific component.

In one embodiment, the ACT 318 can be customized to present all of the application objects that the APIs 304, 306, and 308 can create, and all of the business object model specific components stored in the database. In another embodiment, the ACT 318 may present only some of the application objects and business object model specific objects.

In one embodiment, the application creation options are presented to an end user. In one embodiment, the end user executes the ACT 318 to create the application. Executing the ACT 318 may include selecting an application object from the application objects presented to the end user. The ACT 318 may include a set of steps which the end user performs to select the application object from application objects presented to the end user.

In one embodiment, the ACT 318 may also provide the end user the various pattern specific objects relating to the object relations of the selected business object component for creating the application. As discussed above, the business object model also provides suggestions of the different pattern specific components that can be created for the object relations of the selected business object component. The end user can then select or deselect the object relations and the pattern specific components corresponding to the selected object relation that are then created by the pattern specific API 306.

In one embodiment, the application creation service invoking methods of the ACT 318 send the application creation request to the business object model specific service 314. The business object model specific service 314 invokes the business object model specific API 308 for retrieving the selected business object component, in the application creation request, from the database 316.

Further, the business object model specific service 314 invokes the pattern specific service 312 for creating the pattern specific components, in the application creation request, for the application. Finally, the pattern specific service 312 invokes the user interface specific service 310 for creating the user interface specific objects, in the application creation request, for the application.

In another embodiment, the application creation service invoking methods of the ACT 318 may send the application creation requests related to the business object model specific objects to the business object model specific service 314, the application creation request relating to the pattern specific objects to the pattern specific service 312, and the application creation request relating to the user interface specific object to the user interface specific service 310.

Based on the received application creation request, the application creation services 310, 312, and 314 invokes the application creation APIs 304, 306, and 308 for creating the application. In one embodiment, the application creation service invokes the plurality of application creation methods for creating the application.

Finally, the set of application creation APIs configure the created application objects to create the application. As shown, the user interface specific service 310 is in communication with the database 316. The user interface specific service 310 transfers the created application to the database 316, which stores the created application.

In one embodiment, the ACT 318 also includes methods for setting the generic feeder class for the different pattern specific objects such as forms, list, etc. During a standard implementation the ACT assigns standard feeder classes to the different pattern specific objects. The relationship between the feeder class and the pattern specific objects is defined at the business object model specific service 314. For example, the relationship in the business object model specific service 314 may include relationships such as, a feeder class corresponding to a form is a generic form feeder class, a feeder class corresponding to a list is a list feeder class, etc. As discussed above, the feeder class defines the structure of the different pattern specific objects. Therefore based on the assigned feeder class for a particular pattern specific object, the pattern specific API 306 creates the different pattern specific objects.

In one embodiment, the ACT 318 is provided to the customer or consumer along with the ACT toolkit 302. The customer or consumer provides this ACT 318 to the end user for creating the application.

In another embodiment, only the ACT toolkit 302 is provided to the partner or the customer. A developer on the partner or customer end creates the ACT 318 using the ACT toolkit 302. In one embodiment, a developer may be a software vendor or any individual group, or other entity capable of developing and customizing application creation tools. In one embodiment, the customer or partner may represent a business entity or any other individual, group, or entity capable of providing the ACT 318 to the end user to create the application.

As discussed above, the user interface specific API 304, the pattern specific API 306, and the business object model specific API 308 can be used to create application objects which may be used to create different applications.

The developer creates the ACT 318 based on application creation objects, which the partner or customers wants to provide to the end user for creating the application.

In one embodiment, the developer at the partner or customer end creates the ACT 318 by creating application creation service invoking methods for the ACT 318. The created application creation service invoking methods are defined to call the business object model specific service 314, the pattern specific service 312, and the user interface specific service 310. The called application creation service invokes the set of application creation APIs to create application objects. In one embodiment, the ACT 318 is provided a user interface for presenting the application creation options.

As discussed in an example above, the pattern specific API 312 can be invoked to create the OI floorplan, the GA floorplan, etc. Consider that the customer or the partner wants to provide only the OI Floorplan option to the end user for creating the UI application. The developer creates the application creation service invoking method, for the ACT 318, which is defined to invoke the pattern specific service. The called pattern specific service 312 invoke the pattern specific API 306 for creating the OI floorplan.

Similarly, the developer or the partner can also obtain ACT 318 that provides the end user options to choose between one of the OI Floorplan or the GA Floorplan for creation of the application. In this case, the developer creates application creation service invoking methods for calling the pattern specific service. The called pattern specific service 312 invoke the pattern specific API 306 for creating the OI floorplan or the GA floorplan, based on the floorplan selected for creating the application by the end user.

In one embodiment, at least one of the user interface specific service 310, the pattern specific service 312, or the business object model specific service 314 can be re-defined by the developer to create a customized application object for the application. As shown, the user interface specific service 310 is being re-defined to obtain a re-defined user interface (UI) specific service 320. In one embodiment, the re-defined user interface specific service 320 inherits the user interface specific service 310.

As discussed in an example above, the user interface specific service 310 can invoke the application creation method "Create Toolbar Button" of the user interface specific API 304 to create a "save" button, whereas the re-defined user interface specific service 320 can invoke the user interface specific method "Create Toolbar Button" to create a "save" button and a close button.

Consider another example for re-defining the business object model specific service 314. As discussed above, the relationship between the pattern specific objects and the feeder class is defined in the business object model specific service 314. The feeder class includes methods which define the way the pattern specific objects are to be created. If the partner or customer wants to change the pattern specific object "form", such that the application has the partner or customer defined form then the developer re-defines the form feeder class to obtain a re-defined form feeder class. The next time the ACT 318 is executed by the end user, the ACT 318 assigns the re-defined form feeder class to the form. Based on the re-definition defined in form feeder class, the pattern specific API 306 creates the form as re-defined by the partner or customer.

The feeder class may also be redefined to add custom fields or actions. For example, the feeder class for the pattern specific component "form" may be re-defined such that a checkbox is created within the form. The re-defined form feeder class may also define an action when the checkbox or any of the pre-existing fields, of the form is selected. The feeder class may also be re-defined to change the runtime behavior of the different pattern specific components. For example, the feeder class for the form may be re-defined such that additional input checks are provided to the end user, for providing input to the form, during the run-time of the created application.

Similarly the pattern specific service 312 can also be redefined by the developer to obtain customized user interface.

In one embodiment, redefining the user interface specific service 310, the pattern specific service 312, or the business object model specific service 314 includes replacing these application creation services with re-defined application creation services, i.e., re-defined user interface specific service 320, re-defined pattern specific service 324, and re-defined business object (BO) model specific service 326. For example, when the business object model is changed from BOL to BOPF there is a change in the metadata from BOL to BOPF. Due to this, the business object model specific service 314 which has been defined for BOL cannot access the BOPF related data. Therefore, the BOL specific service (business object model specific service 314) is replaced with a BOPF specific service (re-defined business object model specific service 326). The pattern specific service 312 and the business object model specific service 310 may remain un-changed in this case The BOPF specific service (re-defined business object model specific service 326) is defined to communicate with the pattern specific service 312.

In one embodiment, when a lower level application creation service is re-defined, the application creation service above this application creation service is also re-defined, i.e., if the developer is re-defining the pattern specific service 312 the developer also re-defines the business object model specific service 314 which is above it. Similarly, if the developer is re-defining the user interface specific service 310, the developer also redefines the pattern specific service 312 and the business object model specific service 314 which are above the user interface specific service 310.

As discussed above, the ACT 318 transfers the user selected application objects to the business object model specific service 314. The business object model specific service 314 then invokes the pattern specific service 312 for transferring the user selected application objects to the pattern specific service 312. The pattern specific service 312 then invokes the user interface specific service 310 to transfer the user selected application objects to the user interface specific service 310.

In case, the user interface specific service 310 is re-defined to obtain re-defined user interface specific service 320. The business object model specific service 314 and the pattern specific service 312 (i.e., the service layers above the user interface specific service 310) of the ACT toolkit 302 are not configured to communicate with the re-defined user interface specific service 320. Due to this, the business object model specific service 314 and the pattern specific service 312 cannot transfer the application creation data to the re-defined user interface specific service 320. Therefore, after the developer develops the re-defined user interface specific service 320, the developer also develops the re-defined business object model specific service 326 and the re-defined pattern specific service 324. The re-defined business object model specific service 326 and the re-defined pattern specific service 324 are defined to invoke the re-defined user interface specific service 320 for transferring the user selected application objects to the re-defined user interface specific service 320.

After the re-definition of the application creation service invoking method of the ACT 318 when the end user executes the customized ACT, the end user obtains the customized application object for the application based on the re-definition of the user interface specific service 310.

FIG. 4A-4D illustrates steps provided by an Application Creation Tool (ACT) 400 for creating an application, according to an embodiment. In one embodiment, the ACT 400 is a BOL model based ACT, i.e., the ACT 400 creates application based on the BOL model based on BOL model based business objects.

As shown, the ACT 400 provides four steps 402, 404, 406, and 408 for creating the application. The ACT 400 provides a plurality of UI application creation options in the four steps 402, 404, 406, and 408. Initially at step 402, the ACT 400 provides a name 410 and a description 412 for the application. As shown, the user provides the application name 410 as ZZCAPPL and the description 412 of the application as "Demo Application for EyeCatcher".

In step 402 the end user is also provided a user interface application creation option "Select Floorplan" 414 to choose a particular floorplan (pattern specific object), for the UI application. The ACT 400 can provide the end user options to choose a floorplan from the plurality of floorplans that the pattern specific API can create. As shown, the end user selects the overview page floorplan 416 for creating the UI application.

Next at step 404, as shown in FIG. 4B, the end user selects a BOL component "EPM" 418, for creating the application. The end user also selects a query name 420 "AdvQuery-Orderby Header." Query defines an entry point for the application and can be used to search specific business objects within BOL during runtime of the application.

The BOL component 418 "EPM" selected at step is transferred to the business object model specific API which retrieves the object relations (business object model specific objects) related to the business object component 418 "EPM" from the database. The business object model specific API then provides the object relations 422 to the ACT 400, which is displayed at step 406 (FIG. 4C).

As discussed above, the business object model BOL also provides suggestions of pattern specific objects to be created for each of the object relations 422 of the selected business object component 418 "EPM". As shown, the ACT 400 provides a plurality of pattern specific objects 424 "GUIBB Type" corresponding to the plurality of object relations 422. As shown, the pattern specific objects 424 include a form "FORM_GL2", a list "LIST" and search "SEARCH" pattern specific objects for the different object relations 422 of the selected business object component 418.

The feeder classes 426 corresponding to the plurality of pattern specific objects 424 is also provided. The feeder classes 426 are standard feeder class for the pattern specific objects 424 form, list and search. As discussed above, a developer can re-define the feeder class in which case these standard feeder class 426 will be replaced by the re-defined feeder class, As shown, the end user is provided the choice to select or deselect a one or more of the object relations 422 by using the check boxes provided in the "Join Configurations" 428 and "Create" 430. The pattern specific objects 424 corresponding to the object relations selected at 428 and 430 are the pattern specific objects to be created for the application.

Figure 4A:
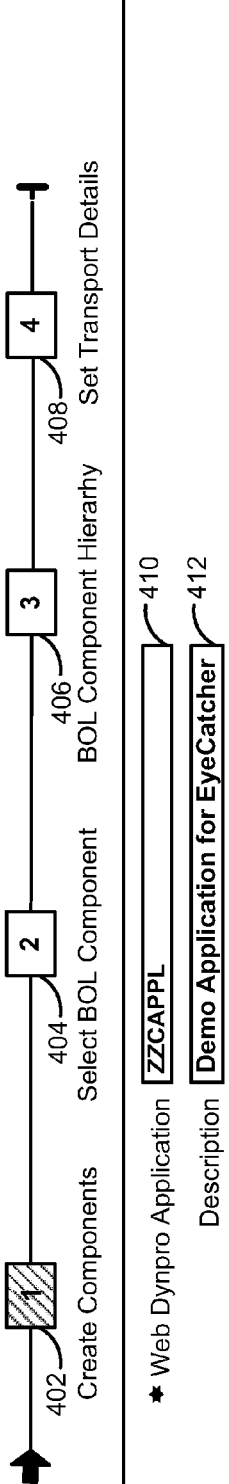
Figure 4D:
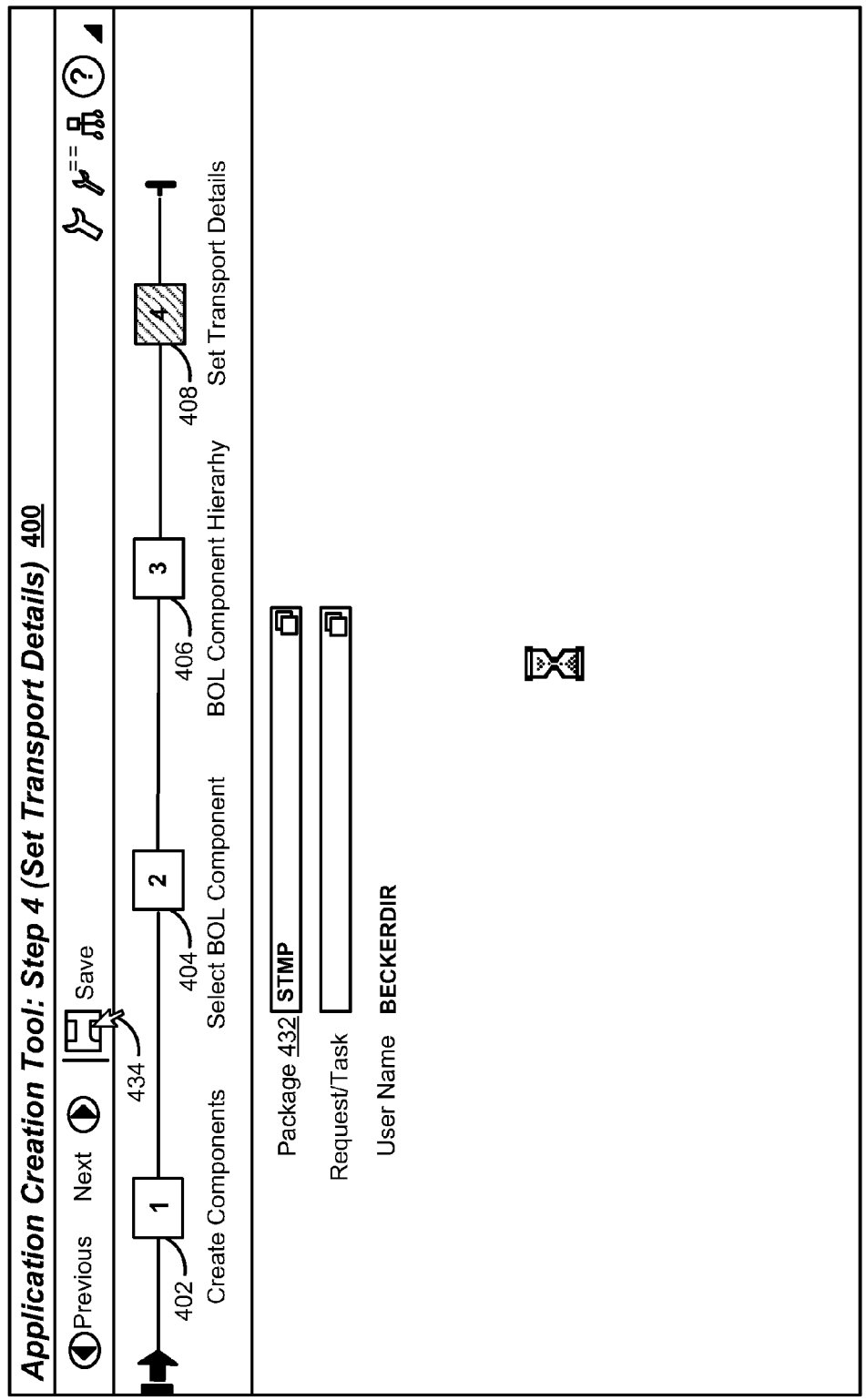

Finally at step 408 a package 432 is assigned for the application which is then saved 434 (FIG. 4D). After the end user executes the four steps 402-408, the various pattern specific objects, which are selected at step 406, and the floorplan 416 selected at step 402 are transferred to the pattern specific service, either directly or via the business object model specific service, which invokes the pattern specific API to create and configure these pattern specific objects for the application. The created application is then stored in the database.

The business object model specific API connects the created pattern specific objects with the database via the assigned feeder class.

Figure 5:
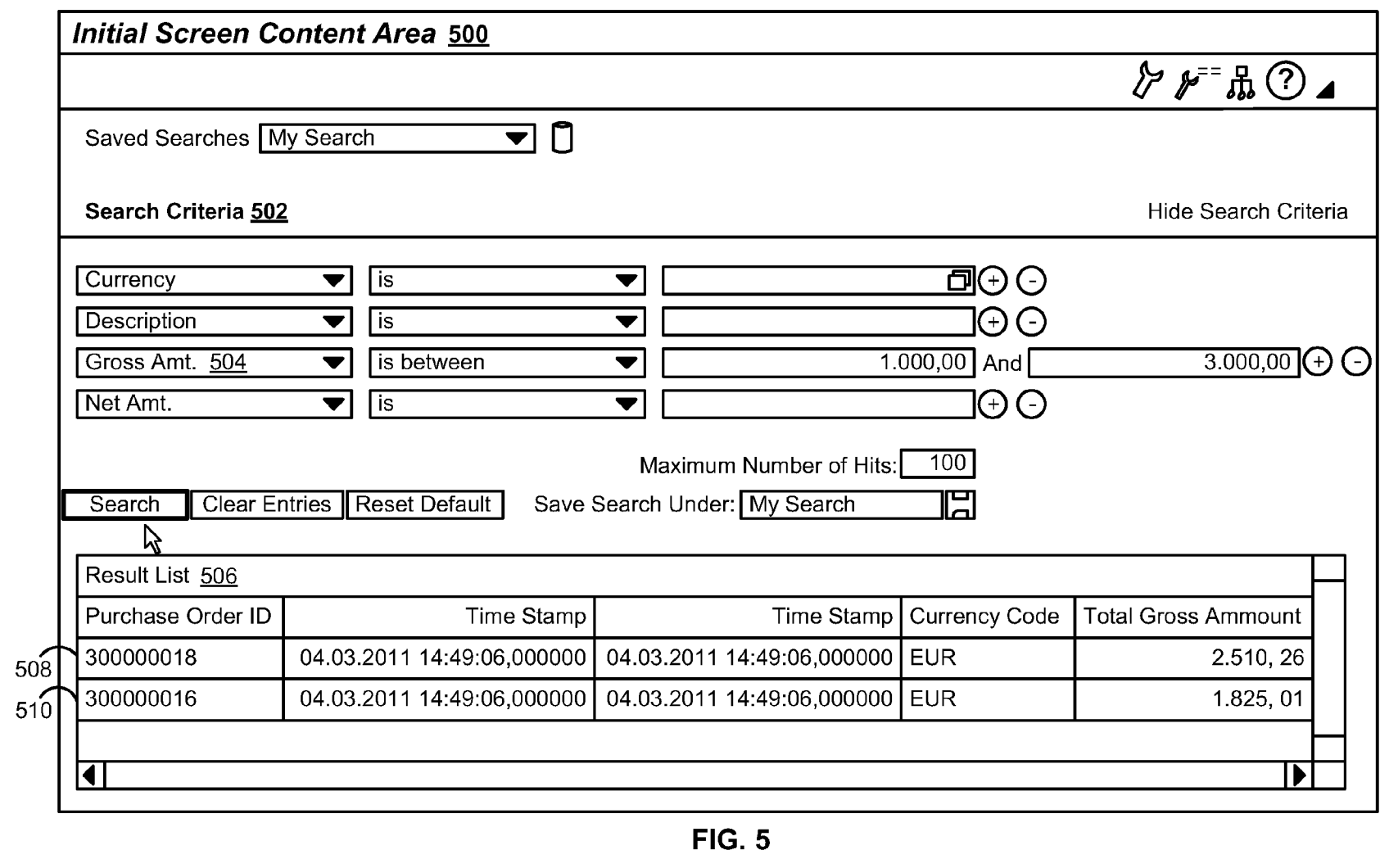

FIG. 5 illustrates the application created based on the user selected application objects selected at the ACT 400 in FIG. 4A-4D, according to an embodiment. As shown, the created application "Initial Screen Content Area" 500 is a search application for performing search based on different search criteria 502.

As shown the end user performs a search for "Gross Amt." 504 within the range of 1000 and 3000.

The result of the search is shown in a "Result List" 506 which provides all the purchase orders within the gross amount of 1000 and 3000. As shown, the result list 506 includes two purchase orders 508 and 510 in the range of 1000 and 3000.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
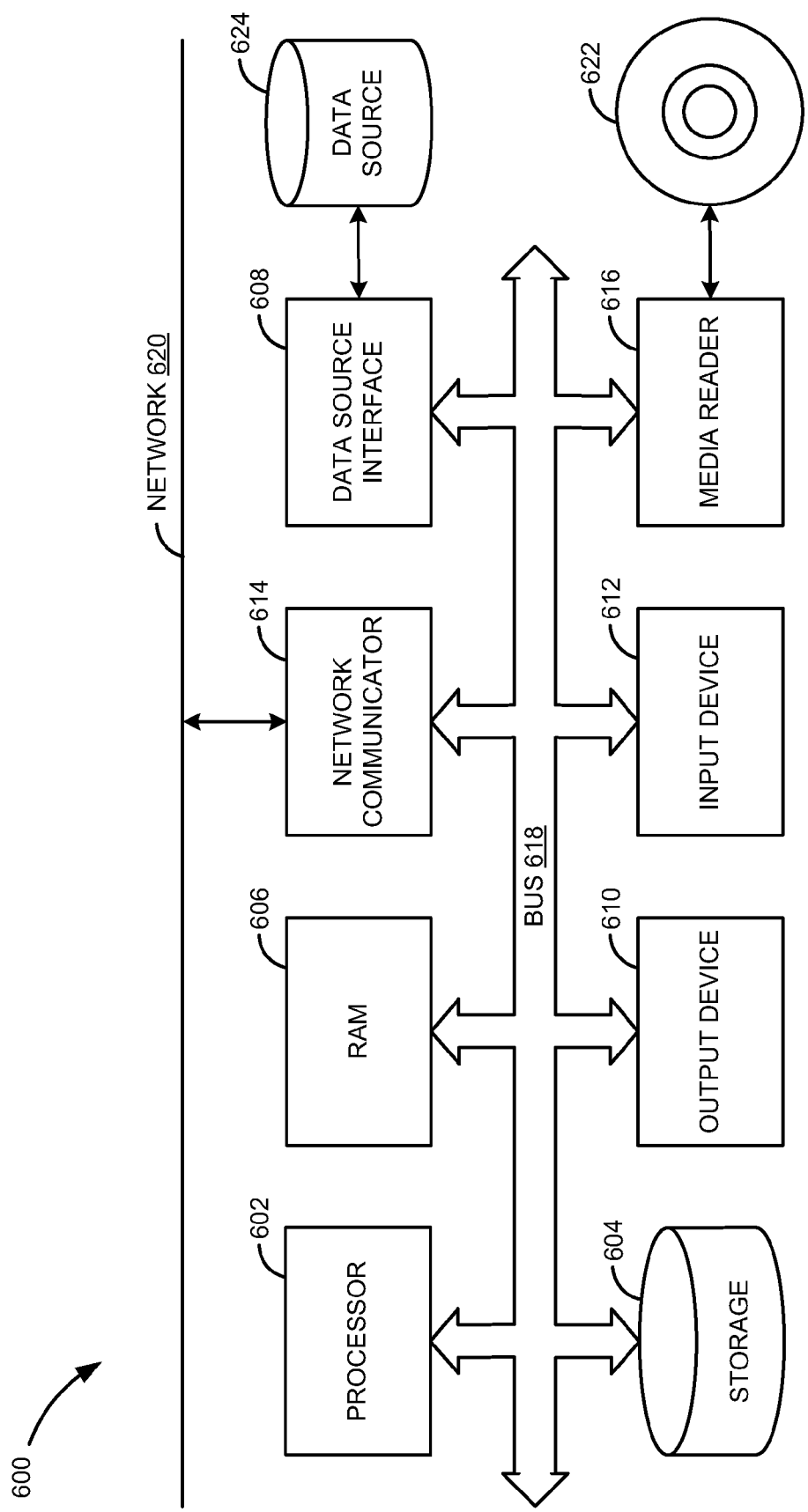
FIG. 6 is a block diagram illustrating a computing environment in which the techniques described for the customization of application creation tool (ACT) can be implemented, according to an embodiment.

FIG. 6 is a block diagram of an exemplary computer system 600. The computer system 600 includes a processor 602 that executes software instructions or code stored on a computer readable storage medium 622 to perform the above-illustrated methods of the invention. The computer system 600 includes a media reader 616 to read the instructions from the computer readable storage medium 622 and store the instructions in storage 604 or in random access memory (RAM) 606. The storage 604 provides a large space for keeping static data where at least some instructions could be stored for later execution. The stored instructions may be further compiled to generate other representations of the instructions and dynamically stored in the RAM 606. The processor 602 reads instructions from the RAM 606 and performs actions as instructed. According to one embodiment of the invention, the computer system 600 further includes an output device 610 (e.g., a display) to provide at least some of the results of the execution as output including, but not limited to, visual information to users and an input device 612 to provide a user or another device with means for entering data and/or otherwise interact with the computer system 600. Each of these output devices 610 and input devices 1112 could be joined by one or more additional peripherals to further expand the capabilities of the computer system 600. A network communicator 614 may be provided to connect the computer system 600 to a network 620 and in turn to other devices connected to the network 620 including other clients, servers, data stores, and interfaces, for instance. The modules of the computer system 1100 are interconnected via a bus 618. Computer system 600 includes a data source interface 608 to access data source 624. The data source 624 can be accessed via one or more abstraction layers implemented in hardware or software. For example, the data source 624 may be accessed by network 620. In some embodiments the data source 624 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method for customizing an application creation tool (ACT), the method comprising:
    receiving an input to re-define an application creation service of an ACT toolkit, wherein the application creation service includes a business object model specific service for retrieving a plurality of business object model specific objects from a database, the application creation service invoking a set of application creation APIs of the ACT toolkit to create a plurality of application objects for an application, wherein the set of application creation APIs comprises: a user interface specific API for invoking a user interface specific object, a pattern specific API for invoking a pattern specific object, and a business object model specific API for retrieving the plurality of business object model specific objects from the database, wherein the plurality of application objects comprises a plurality of user interface specific objects, and a plurality of pattern specific objects, the redefined application creation service invoking the set of application creation APIs to create a customized application object for the application;
    establishing a communication between the re-defined application creation service and the ACT; and
    based on the established communication between the re-defined application creation service and the ACT, generating, by a processor of a computer, a customized ACT, wherein via the established communication, the re-defined application creation service receives an application creation request from the customized ACT for creating the customized application object for the application.

2. The computer implemented method according to claim 1, wherein based on the received application creation request, the redefined application creation service invokes the application creation APIs to create the customized application object for the application.

3. The computer implemented method according to claim 2 further comprising:
    re-defining an application creation service invoking method of the ACT to send the application creation request to the re-defined application creation service.

4. The computer implemented method according to claim 1, wherein re-defining the application creation service includes inheriting the application creation service to the re-defined application creation service.

5. The computer implemented method according to claim 1, wherein re-defining the application creation service comprises:
    replacing the application creation service with the re-defined application creation service.

6. A non-transitory computer readable storage medium to tangibly store instructions, which when executed by a computer, cause the computer to:
    receive an input to re-define an application creation service of an ACT toolkit, wherein the application creation service includes a business object model specific service for retrieving a plurality of business object model specific objects from a database, the application creation service invokes a set of application creation APIs of the ACT toolkit to create a plurality of application objects for an application, wherein the set of application creation APIs comprises: a user interface specific API for invoking a user interface specific object, a pattern specific API for invoking a pattern specific object, and a business object model specific API for retrieving the plurality of business object model specific objects from the database, wherein the plurality of application objects comprises a plurality of user interface specific objects, and a plurality of pattern specific objects, the redefined application creation service invokes the set of application creation APIs to create a customized application object for the application;
    establish a communication between the re-defined application creation service and the ACT; and
    based on the established communication between the re-defined application creation service and the ACT, generate a customized ACT, wherein via the established communication, the re-defined application creation service receives an application creation request from the customized ACT for creating the customized application object for the application.

7. The non-transitory computer readable medium according to claim 6, wherein based on the received application creation request, the redefined application creation service invokes the application creation APIs to create the customized application object for the application.

8. The non-transitory computer readable medium according to claim 7, further comprising instructions which when executed by the computer further causes the computer to:
    re-define an application creation service invoking method to send the application creation request to the re-defined application creation service.

9. The non-transitory computer readable medium according to claim 6, wherein re-defining the application creation service includes inheriting the application creation service to the re-defined application creation service.

10. The non-transitory computer readable medium according to claim 6, further comprising instructions which when executed by the computer further caused the computer to:
    replace the application creation service with the redefined application creation service.

11. An application creation framework stored in a memory, comprising:

an application creation tool (ACT) toolkit, stored in the memory, wherein the ACT toolkit comprises:
a set of application creation APIs for creating a plurality of application objects, wherein the set of application creation APIs comprises: a user interface specific API for invoking a user interface specific object, a pattern specific API for invoking a pattern specific object, and a business object model specific API for retrieving a plurality of business object model specific objects from the database, wherein the plurality of application objects comprises a plurality of user interface specific objects, and a plurality of pattern specific objects; and
an application creation service to invoke the set of application creation APIs, wherein the application creation service includes a business object model specific service for retrieving the business object model specific objects from a database;
an application creation tool (ACT) in communication with the application creation service, the ACT sending an application creation request to the application creation service for creating an application, wherein, based on the received application creation request, the application creation service invokes the set of application creation APIs to create one or more of the plurality of application objects for the application; and
the database in communication with the set of application creation APIs, the database storing the created application.

12. The application creation framework according to claim 11, wherein the ACT is customizable to present one or more of the plurality of business object model specific objects.

13. The application creation framework according to claim 11, wherein the application creation service comprises:
a user interface specific service for invoking the user interface specific API; and
a pattern specific service for invoking the pattern specific API.

14. The application creation framework according to claim 11, wherein the set of application creation APIs comprises a plurality of application creation methods for creating the plurality of application objects.

15. The application creation framework according to claim 11, wherein the ACT includes an application creation service invoking method for sending the application creation request to the application creation service, the application creation service invoking method being redefined to send the application creation request to a re-defined application creation service, the re-defined application creation service invoking the set of application creation APIs to create a customized application object from the plurality of application objects for the application.

16. The application creation framework according to claim 11, wherein the ACT is customizable to present a plurality of application creation options, the plurality of application creation options including one or more of the plurality of application objects for creating the application, and wherein the application creation request includes a user selected application object from the presented one or more of the plurality of application objects for creating the application.

* * * * *